United States Patent [19]

Kawamura

[11] Patent Number: 4,892,476

[45] Date of Patent: Jan. 9, 1990

[54] APPARATUS FOR CONTROLLING COMBUSTION IN HEATER

[75] Inventor: Hideo Kawamura, Samukawa, Japan

[73] Assignee: Isuzu Motors Limited, Tokyo, Japan

[21] Appl. No.: 111,056

[22] Filed: Oct. 22, 1987

[30] Foreign Application Priority Data

Oct. 29, 1986 [JP] Japan .................................. 61-257474

[51] Int. Cl.⁴ .............................................. F23N 1/00
[52] U.S. Cl. ........................................ 431/36; 431/28;
  431/41; 431/11; 431/75; 431/208; 237/2 A;
  237/12.3 C
[58] Field of Search ...................... 431/208, 28, 74, 36,
  431/41, 27, 29, 11, 259, 75; 237/2 A, 12.3 C

[56] References Cited

U.S. PATENT DOCUMENTS

| | | | |
|---|---|---|---|
| 2,286,856 | 6/1942 | Holthouse | 431/41 X |
| 3,102,577 | 9/1963 | Dekker | 431/41 |
| 3,393,038 | 7/1968 | Burkhalter et al. | 431/75 |
| 4,613,301 | 9/1986 | Miyoshi et al. | 431/259 |

FOREIGN PATENT DOCUMENTS

| | | | |
|---|---|---|---|
| 808875 | 11/1976 | Australia | 431/41 |
| 961083 | 6/1964 | United Kingdom | 431/28 |

Primary Examiner—Carl D. Price
Attorney, Agent, or Firm—Staas & Halsey

[57] ABSTRACT

An apparatus for controlling the combustion in a heater detects the temperature in a burner and selects a re-ignition mode for fuel dependent on the temperature in the burner. The apparatus controls an atomizing device which atomizes fuel in the selected re-ignition mode, and an igniting device which ignites the fuel atomized by the atomizing device.

5 Claims, 3 Drawing Sheets

APPARATUS FOR CONTROLLING COMBUSTION IN HEATER

BACKGROUND OF THE INVENTION

The present invention relates to an apparatus for controlling the combustion in a heater, and more particularly to an apparatus for controlling the combustion in a heater to control the condition in which fuel is combusted in the heater.

The passenger compartment or cabin of a vehicle is heated by supplying the compartment with hot air heated by cooling water of the internal combustion engine of the vehicle. However, in cold weather, it takes time to increase the temperature of the cooling water, and hence the compartment cannot be heated quickly.

Japanese Laid-Open Patent Publication No. 61-157422 discloses a proposed vehicle heater device in which fuel is combusted by a burner separate from the internal combustion engine and heat generated by the fuel combustion is recovered by a heat exchanger to supply heating air into the compartment, the burner being controlled dependent on the operating condition of the engine. In the disclosed vehicle heater device, a controller including a bridge circuit and a comparator is employed to control supplied electric power to keep the temperatures of an atomizing glow plug and an igniting glow plug in the burner at respective predetermined temperature levels.

According to the aforementioned vehicle heater device, the temperatures of the atomizing and igniting glow plugs are controlled at the respective temperature levels, as described above. In the event that operation of the burner is interrupted due to an engine failure or the like and the burner is to be ignited again, only a basic re-ignition mode is used without concern over different ignition performances of fuels. Where the temperature in the burner is low or a low-quality fuel is used, the fuel cannot be re-ignited, and the combustion remains interrupted.

SUMMARY OF THE INVENTION

It is an object of the present invention to provide an apparatus for controlling the combustion in a heater, the apparatus being capable of reliably re-igniting a fuel of a different atomizing characteristic by effecting combustion control in a re-ignition mode matching that fuel.

According to the present invention, there is provided an apparatus for controlling the combustion in a heater including a burner having an atomizing device for atomizing supplied fuel and an igniting device for igniting fuel atomized by the atomizing device, the apparatus comprising detector means for detecting the temperature in the burner, means for selecting a re-ignition mode based on a signal from the detector means, and control means for controlling the atomizing device and/or the igniting device in the re-ignition mode selected by the re-ignition mode selecting means.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
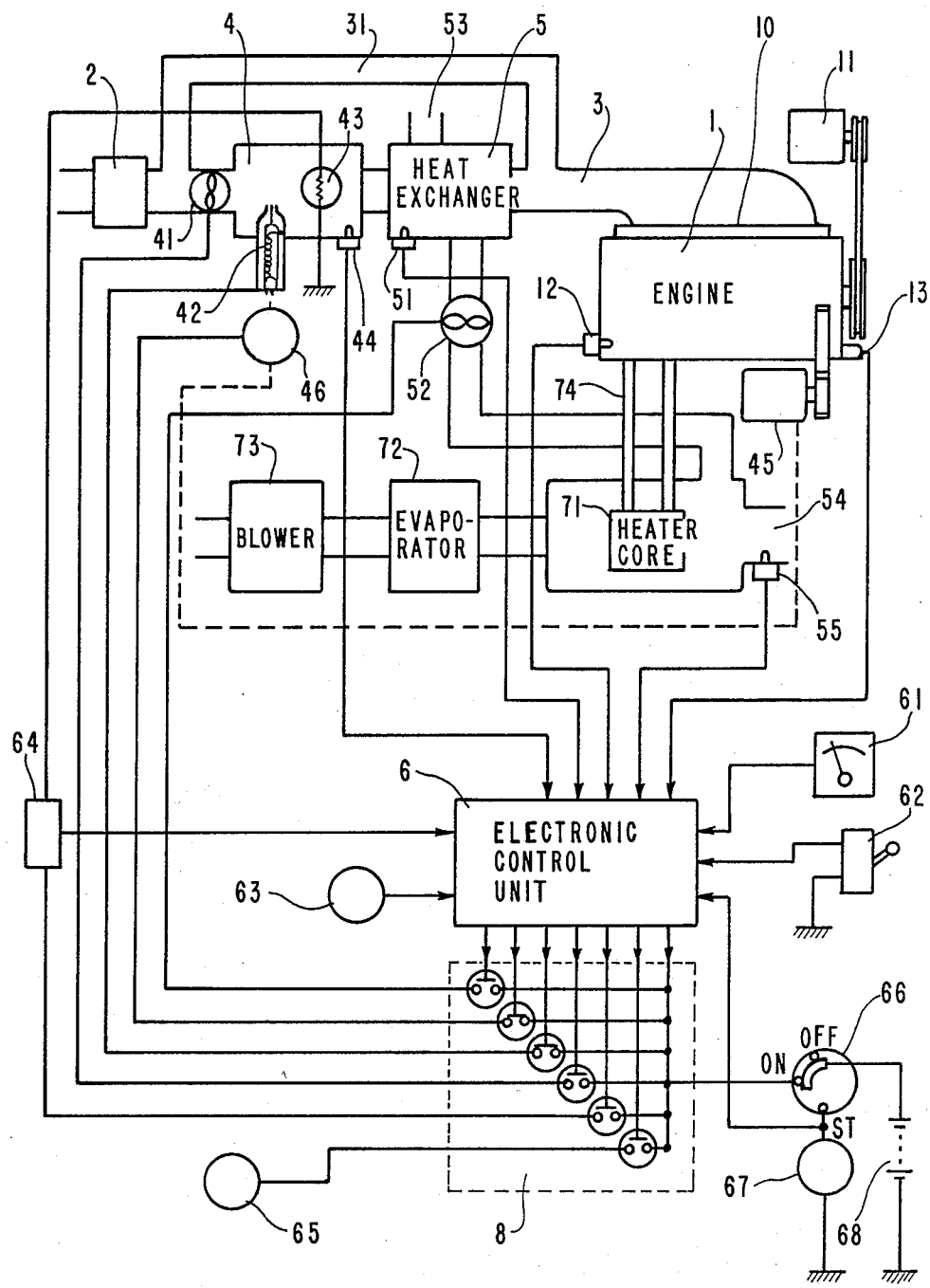
FIG. 1 is a block diagram of an apparatus for controlling the combustion in a heater according to an embodiment of the present invention.

As shown in FIG. 1, an internal combustion engine 1 has an intake manifold 10 connected to an air cleaner 2 through an intake pipe 3. In the intake pipe 3, there are disposed a burner 4 for combusting fuel and a heat exchanger 5 positioned downstream of the burner 4. The intake pipe 3 is bypassed by a bypass passage 31 which directly connects the air cleaner 2 to the internal combustion engine 1 in bypassing relation to the burner 4 and the heat exchanger 5.

The burner 4 has an inlet where a combustion blower 41 is located for supplying combustion air into the burner 4. The burner 4 has an atomizing glow plug 42 serving as an atomizing device for heating and atomizing supplied fuel, an igniting glow plug 43 serving as an igniting device for igniting the atomized fuel, and a flame sensor 44 serving as detector means for detecting the temperature in the burner 4. The flame sensor 44 has a resistance wire of a positive temperature coefficient of resistance. The combustion temperature in the burner can be detected by an electronic control unit (described later) which reads the resistance value of the flame sensor 44.

Fuel is supplied to the burner 4 by a fuel pump 45 and a fuel control valve 46 through the atomizing device heated by the atomizing glow plug 42. The rate of supply of the fuel is controlled by a command signal from an electronic control unit 6 which controls the duty cycle of the fuel control valve 46 to open and close the same. An electric current supplied to the atomizing glow plug 42 is controlled in its duty cycle by a command signal from the electronic control unit 6. The temperature to which the atomizing glow plug 42 is heated can be controlled according to the atomizing performance of the fuel.

A heat exchanger sensor 51 is attached to the heat exchanger 5 for detecting the temperature therein. Air introduced through an air inlet 53 and heated by heat recovered by the heat exchanger 5 is delivered by a hot air blower 52 into a vehicle passenger compartment or cabin through an outlet 54 associated with a hot air temperature sensor 55 which measures the temperature of the supplied hot air.

Operation with respect to the burner 4 and the heat exchanger 5 will be described below. Fuel supplied from the fuel pump 45 via the fuel control valve 46 to the atomizing glow plug 42 is atomized by the atomizing glow plug 42 which has been heated by electric energization, and the atomized fuel is ejected into the burner 4. The atomized fuel is mixed with air which has been supplied from the air cleaner 2 by the blower 41 to produce a combustible air-fuel mixture. The combustible air-fuel mixture is then ignited by the energized igniting glow plug 43 into flames which turn into high-temperature combusted gasses that are delivered to the heat exchanger 5. In the heat exchanger 5, air introduced from the air inlet 53 is heated by the heat of the combusted gasses, and the heated hot air is discharged via the outlet 54 into the cabin to heat the interior thereof.

A heater core 71 is connected to the internal combustion engine 1 by a hot water passage 74, an evaporator 72, and blower 73, all of which are components of a conventional heating and air-conditioning apparatus employing the temperature of cooling water.

A generator 11 is driven by the engine a water temperature sensor 12 detects the temperature of the cooling water, and a load sensor 13 detects the load condition of the engine 1. Detected signals from the water temperature sensor 12 and the load sensor 13 are applied to the electronic control unit 6.

The electronic control unit 6 is composed of a microcomputer comprising a central processing unit for effecting arithmetic operations and counting operating time based on read signals, various memories for storing the results of arithmetic operations and a control program for efficiently controlling the burner, and input/output devices for receiving various read signals and issuing commands to the operating mechanisms. The electronic control unit 6 is connected to the flame sensor 44, the heat exchanger sensor 51, the water temperature sensor 12, the hot air temperature sensor 55, the load sensor 13, a heating position switch 61, an operation switch 62, a fuel selection switch 63, and a plug resistance detector 64 for receiving input signals from these sensors and switches. The plug resistance detector 64 is disposed in a circuit for energizing the igniting glow plug 43 and detects the temperature of the igniting glow plug 43 from the resistance value thereof which has resistance-dependent temperature characteristics by measuring the current passed through the igniting glow plug 43.

The electronic control unit 6 is also connected to a switch device 8 for controlling the various operating mechanisms and applies control commands through the switch device 8 to the hot air blower 52, the fuel pump 45, the fuel control valve 46, the atomizing glow plug 42, the combustion blower 41, the igniting glow plug 43, and an emergency switch 65.

A key switch 66, a starter motor 67, and a battery 68 are arranged such that, when the key switch 66 is turned to start position, the starter motor is energized to start the engine 1, and a start signal is applied to the electronic control unit 6.

Figure 2A:
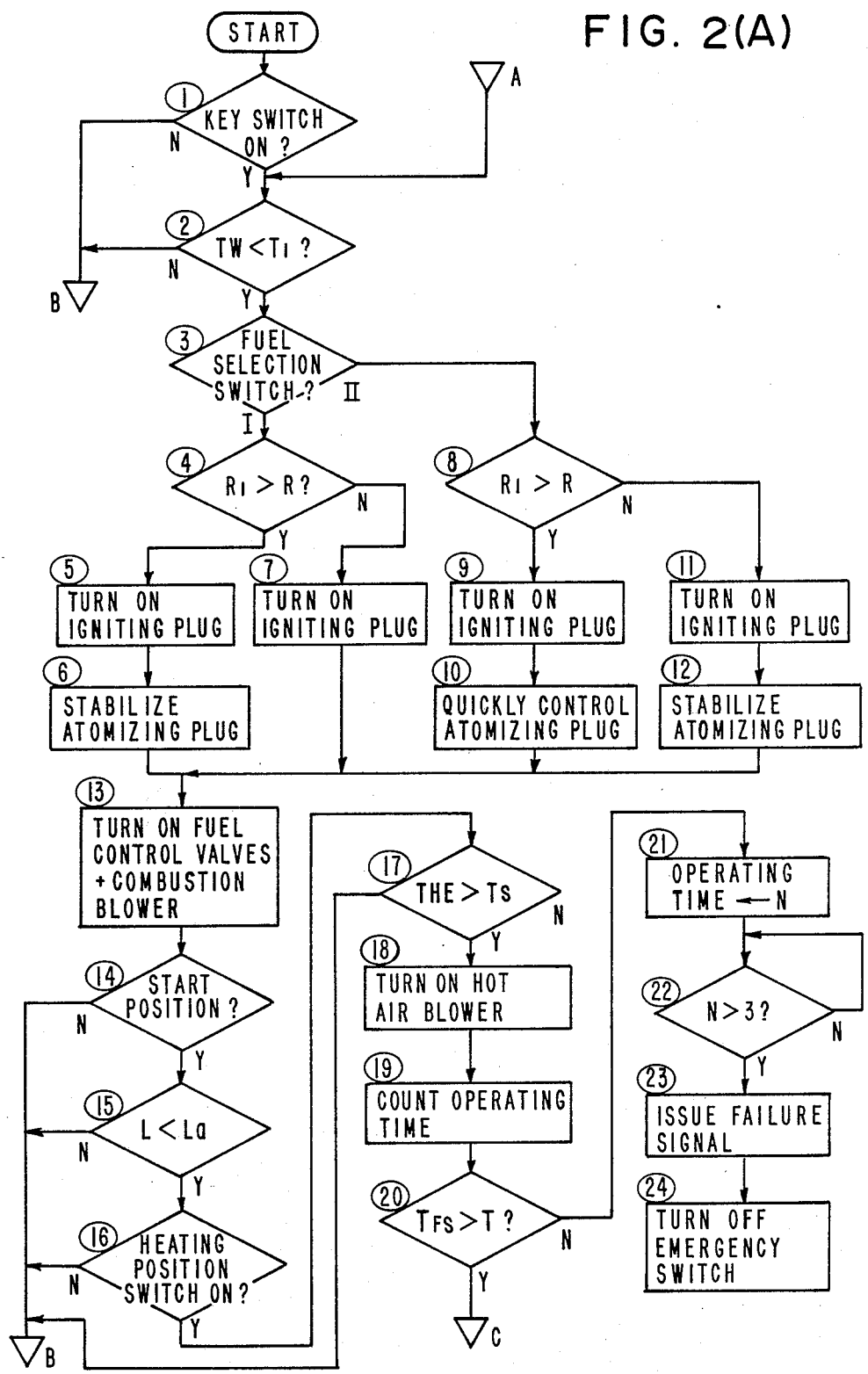
FIGS. 2(A) and 2(B) are flowcharts of an operation sequence of the combustion controlling apparatus shown in FIG. 1.
Figure 2B:
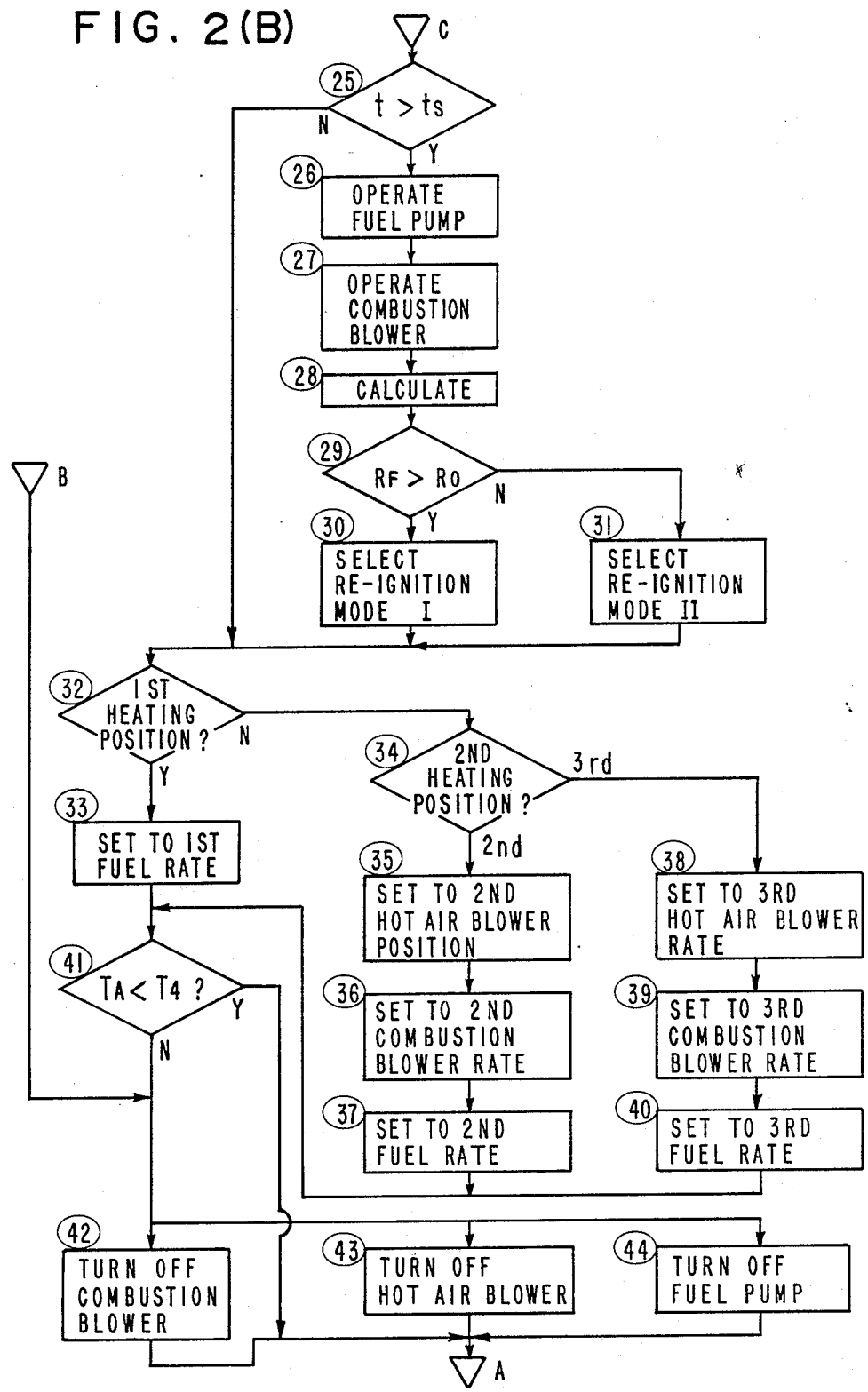

FIGS. 2(A) and 2(B) are flowcharts of an operation senquence of the combustion control apparatus of the present invention. Operation of the apparatus will be described with reference to FIGS. 1 and 2(A), 2(B).

The key switch 66 is turned on to supply electric power from the battery 68 to the electronic control unit 6, and the key switch 66 is further turned to the start position to energize the starter motor for thereby starting the engine 1 (step S1). A step S2 then reads the cooling water temperature $T_W$ from the water temperature sensor 6 and ascertains whether the cooling water temperature has reached a prescribed temperature $T_1$ at which the cooling water is usable for heating the compartment. If the cooling water temperature is below the temperature $T_1$, then control goes from the step S2 to a step S3. The step S3 checks the position of the fuel selection switch 63 which is selected dependent on the atomizing performance of the fuel used. If the fuel selection switch 63 is in a position (I) for good atomizing performance, then control proceeds to a step S4, and if the fuel selection switch 63 is in a position (II) for poor atomizing performance, then control goes to a step S8.

The step S8 checks the resistance value R of the igniting glow plug 43 based on a signal from the plug resistance detector 64. If the resistance value R is higher than a prescribed resistance value $R_1$, i.e., the temperature in the burner 4 is high due to the after heat, control goes to a step S7 in which the igniting glow plug 43 is energized. Since when the temperature in the burner 4 is high, the fuel is atomized by the heat therein and can be ignited even if the atomizing glow plug 42 is not heated, control jumps to a step S13 without energizing the atomizing glow plug 42.

If the resistance value R of the igniting glow plug 43 is lower than $R_1$ in the step S4, the igniting glow plug 43 is energized in a step S5 since it is presumed that the temperature in the burner 4 is low, and the atomizing glow plug 42 is normally energized and heated in a step S6.

If control goes from the step S3 to the step S8 because the fuel used has poor atomizing performance, the resistance value of the igniting glow plug 43 is checked in order to detect the temperature in the burner 4. If the temperature in the burner 4 is high, control goes from the step S8 to a step S11 in which the igniting glow plug 43 is turned on and then to a step S12 in which the atomizing glow plug 42 is normally energized. Therefore, the fuel with poor atomizing performance is adequately be atomized. If the resistance value of the igniting glow plug 43 is low in the step S8, indicating that the temperature in the burner is low, the igniting glow plug 43 is turned on (step S9), and then quick control is effected in a step S10 to heat the atomizing glow plug 42 to a temperature higher than the normal temperature since the supplied fuel would otherwise tend to fail to be sufficiently atomized. Then, control proceeds to step S13.

In step S13, the fuel control valve 46 is opened, fuel is supplied into the burner 4 through the atomizing glow plug 42, and the combustion blower 41 is driven to force combustion air into the burner 4. If the key switch 66 is in the start position in a step S14, if the engine load L as detected by the load sensor 13 for the engine 1 is lower than a prescribed load level La in a step S15, if the heating position switch 61 is turned on in a step S16, and if the heat exchanger temperature $T_{HE}$ as detected by the heat exchanger sensor 51 is higher than a prescribed temperature $T_S$ in a step S17, then control goes to a step S18 in which the hot air blower 52 is energized to start supplying air. If the key switch 66 is not in the start position in the step S14, if the engine load is higher than the load level La in the step S15, if the heating position switch 61 is turned off in the step S16, or if the heat exchanger temperature is lower then the prescribed temperature in the step S17, then control goes to a flow for stopping the operation of the burner.

After the hot air blower 52 has been operated in the step S18, the operating time of the burner is counted in a step S19. A step S20 then checks a signal TFS from the flame sensor 44 on the burner 4. If the burner temperature is higher than a prescribed temperature T, then control goes to a step S25 since the combustion condition is good. If lower than the temperature T, then control proceeds to a step S21 in which a prescribed operating time is set to N. If the operating time N is 3N or more in a step S22, then an failure signal is generated to issue a signal to turn off the emergency switch 65 (steps S23, S24).

If the time ts in which the burner 4 operates to burn the fuel is longer than a prescribed time t in the step S25, then control goes to a step S32 as it is assumed that the combustion condition is stable. If the time ts has not reached the time t, i.e., immediately after re-ignition has started, then the fuel pump 45 is controlled to supply fuel in a step S26, and the combustion blower 41 is controlled to supply air for combustion in a step S27 to activate the combustion in the burner 4. These operations are calculated and a signal $R_F$ from the flame sensor 44 is checked (steps S28, S29). The signal $R_F$ from the flame sensor 44 which corresponds to the temperature in the burner 4 is compared with a prescribed temperaure $R_0$. If the signal $R_F$ is higher than $R_0$, then a predetermined basic re-ignition mode I is selected because the combustion in the burner 4 is good and the fuel can easily be re-ignited (step S30). If the signal $R_F$ is lower than $R_0$, since the fuel is less re-ignitable possibly due to a different fuel, a re-ignition mode II is selected in which the temperatures of the atomizing glow plug 42 and the igniting glow plug 43 are increased for easy re-ignition of the fuel (step S31).

In the step S32, a signal from the heating position switch 61 which has been set to a desired heating temperature is read. If the heating position switch 61 is in the first position, then the fuel control valve 46 is controlled at a first flow rate in a step S33. If the heating position switch 61 is in the second position, then the hot air blower 52, the combustion blower 41, and the fuel control valve 46 are controlled at a second flow rate to increase the fuel and air supply to the burner 4 and also the hot air discharge from the heat exchanger 5 to thereby increase the temperature in the vehicle compartment (steps S34 through S37).

If the heating position switch 61 is in the third position in the step S34, then the hot air blower 52, the combustion blower 41, and the fuel control valve 46 are controlled by the switch device 8 at a third flow rate to discharge hot air via the outlet 54 into the compartment in maximum operation (steps S38 through S40).

If the temperature $T_A$ of the discharged hot air is higher than prescribed hot air temperatures $T_4$ corresponding respectively to the first, second, and third fuel rates in a step S41, then control goes to steps S42, S43, S44 in which operation of the combustion blower 41, the hot air blower 52, and the fuel pump 45 is temporarily interrupted, and then control returns to the step S2. Then, the above flow is repeated.

In the above embodiment, as described above, the combustion condition in the burner is checked according to the electric resistance of the flame sensor associated with the burner during operation of the heater for selecting a re-ignition mode. The atomizing glow plug and the igniting glow plug are controlled in the selected re-ignition mode, so that the fuel, even if it is of low quality, can be re-ignited reliably.

What I claim is:

1. An apparatus for controlling combustion in a heater including a burner having an atomizing device for atomizing supplied fuel and an igniting device for igniting fuel atomized by the atomizing device, the apparatus comprising:

detector means for detecting the temperature in said burner and outputting a temperature signal;

means for selecting a re-ignition mode based on the temperature signal from said detector means;

said re-ignition mode selecting means including means for selecting a first mode in which the atomizing device is operated at a basic atomizing temperature when the temperature in said burner as detected by said detector means is higher than a predetermined temperature, and for selecting a second mode in which the atomizing device is operated at a temperature higher than said basic atomizing temperature when the temperature in said burner is lower than said predetermined temperature; and control means for controlling said atomizing device in the re-ignition mode when selected by said re-ignition mode selecting means.

2. An apparatus according to claim 1, wherein said detector means has a resistance wire having a positive temperature coefficient of resistance.

3. An apparatus according to claim 1, wherein said atomizing device has an atomizing glow plug for heating the fuel.

4. An apparatus according to claim 1, wherein said igniting device comprises a glow plug heatable by being supplied with electric power.

5. An apparatus according to claim 1, wherein said control means comprises means for increasing the temperature of said igniting device when the second mode is selected by said re-ignition mode selecting means.

* * * * *

UNITED STATES PATENT AND TRADEMARK OFFICE
CERTIFICATE OF CORRECTION

PATENT NO. : 4,892,476
DATED : January 9, 1990
INVENTOR(S) : Hideo Kawamura

It is certified that error appears in the above-identified patent and that said Letters Patent is hereby corrected as shown below:

Front Page [56], line 8, change

"808875" to --80887--.

Col. 3, line 8, change "engine a." to

--engine 1. A--.

Signed and Sealed this

Twenty-ninth Day of January, 1991

Attest:

HARRY F. MANBECK, JR.

*Attesting Officer*  *Commissioner of Patents and Trademarks*